(12) United States Patent
Cruz Morales et al.

(10) Patent No.: US 12,675,404 B2
(45) Date of Patent: Jul. 7, 2026

(54) SYSTEMS AND METHODS FOR A PREDICTIVE CACHE OF MACHINE LEARNING MODELS

(71) Applicant: Capital One Services, LLC, McLean, VA (US)

(72) Inventors: Tania Cruz Morales, Washington, DC (US); Purva Shanker, Arlington, VA (US); Shannon Yogerst, New York, NY (US); Haytham Yaghi, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 539 days.

(21) Appl. No.: 18/353,876

(22) Filed: Jul. 17, 2023

(65) Prior Publication Data

US 2025/0028637 A1     Jan. 23, 2025

(51) Int. Cl.
*G06F 1/00* (2006.01)
*G06F 12/0802* (2016.01)
*G06N 20/00* (2019.01)
*G06F 16/00* (2019.01)

(52) U.S. Cl.
CPC ......... G06F 12/0802 (2013.01); G06N 20/00 (2019.01); *G06F 2212/60* (2013.01)

(58) Field of Classification Search
CPC .......... G06F 12/0802; G06F 1/00; G06F 3/00; G06F 16/00; G06N 20/00
USPC .............................. 706/12, 45, 62, 9, 16, 27
See application file for complete search history.

(56) References Cited

U.S. PATENT DOCUMENTS

| | | | |
|---|---|---|---|
| 10,981,567 B2 * | 4/2021 | Sapp ................. | B60W 30/0956 |
| 12,093,988 B2 * | 9/2024 | Liu .................... | G06F 16/24578 |
| 2017/0017576 A1 * | 1/2017 | Cammarota ........ | G06F 12/0893 |

* cited by examiner

*Primary Examiner* — Daquan Zhao
(74) *Attorney, Agent, or Firm* — Foley & Lardner LLP

(57) ABSTRACT

Systems and methods for a predictive cache of machine learning models. In some aspects, the system, in response to a user request, trains one or more machine learning models using a training dataset and inserts the machine learning models into a user library. The system, without input from the user, based on a distribution of values for a first feature in the training dataset, generates a search request for labeled data having a distribution of values within a threshold of the distribution of values of the first feature. The system adds to the training dataset values from the labeled data to generate an updated training dataset. The system trains a proximate machine learning model based on the updated training dataset and inserts the proximate machine learning model into a predictive cache of machine learning models.

20 Claims, 5 Drawing Sheets

400

Train one or more machine learning models using a training dataset and insert the one or more machine learning models into a user library of machine learning models
402

Based on a distribution of values for a first feature, generate a search request to a database for labeled data having a distribution of values within a threshold of the distribution of values of the first feature
404

Generate an updated training dataset by adding in the training dataset values from the labeled data
406

Train a proximate machine learning model based on the updated training dataset and insert the proximate machine learning model into a predictive cache of machine learning models
408

100

200

202

204

206

210

208

214

Machine Learning Model
212

Proximate Machine Learning Model
216

User Library
217

Predictive Cache
218

400

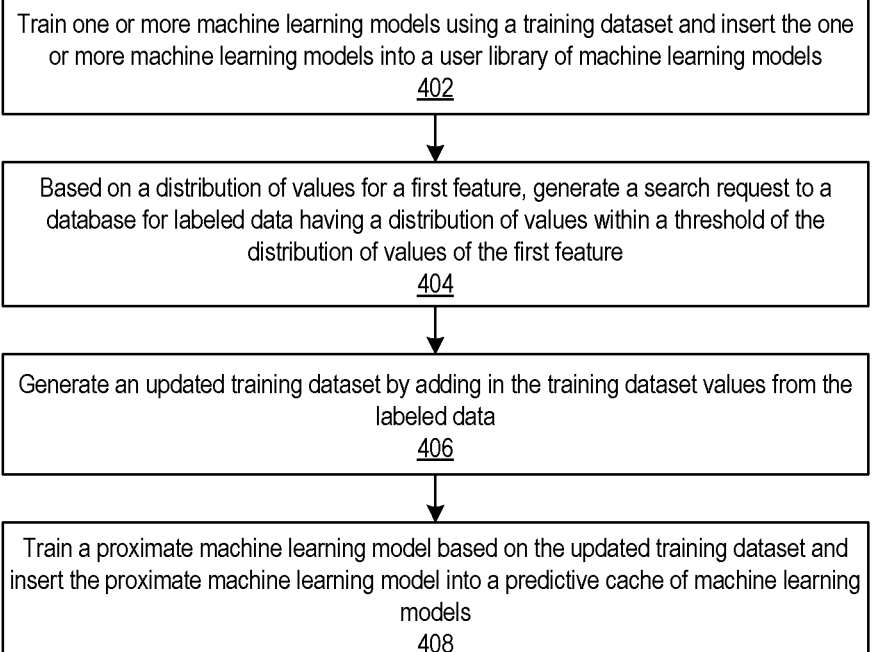

Train one or more machine learning models using a training dataset and insert the one or more machine learning models into a user library of machine learning models
402

Based on a distribution of values for a first feature, generate a search request to a database for labeled data having a distribution of values within a threshold of the distribution of values of the first feature
404

Generate an updated training dataset by adding in the training dataset values from the labeled data
406

Train a proximate machine learning model based on the updated training dataset and insert the proximate machine learning model into a predictive cache of machine learning models
408

*FIG. 4*

SYSTEMS AND METHODS FOR A PREDICTIVE CACHE OF MACHINE LEARNING MODELS

SUMMARY

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high quality can be complex and time consuming. Additionally, data that is obtained may need to be categorized and labeled accurately, which can be difficult, time consuming, and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. In particular, current machine learning model generation systems fail to automatically generate new machine learning models without user input.

Methods and systems are described herein for novel uses and/or improvements to artificial intelligence applications. As one example, methods and systems are described herein for leveraging already existing models and labeled data points to generate new machine learning concepts. Existing systems do not generate a predictive cache of machine learning models without user input and using previously labeled data points. For example, in existing systems, users create machine learning models for specific machine learning concepts and then search for data points that need to be labeled for the model. However, the difficulty in adapting artificial intelligence models for this practical benefit faces several technical challenges such as current machine learning architectures are too slow to generate results due to the time it takes to label data points and create machine learning models.

To overcome these technical deficiencies in adapting artificial intelligence models for leveraging already existing models and labeled data points to generate new machine learning concepts, methods and systems disclosed herein without input from the user, based on a distribution of values for a first feature of the plurality of features, generate a search request to the database for labeled data having a distribution of values within a threshold of the distribution of values of the first feature. In response to the search request being successful, the methods and systems generate an updated training dataset and train a proximate machine learning model. A proximate machine learning model may refer to a machine learning model that is generated based on a previous user request to generate a machine learning model. Proximate machine learning models may be created without any request from the user using previously labeled data points and may be inserted into a predictive cache. For example, by generating proximate machine learning models based on similar features, the system may generate new machine learning concepts that the user has not yet considered. If a user subsequently submits a request to generate a machine learning model matching a proximate machine learning model, the proximate machine learning model may be removed from the predictive cache and inserted into the user's library. Additionally, by generating proximate machine learning models based on similar features before a user requests the system to generate that model, the system speeds up machine learning model deployment. Accordingly, the methods and systems provide a way to leverage already existing machine learning models and labeled data points to generate new machine learning concepts.

In some aspects, the problems described above may be solved using a system that may perform the following operations. The system may train a machine learning model using a training dataset and insert the machine learning model into a user library of machine learning models. The system may then without user input, generate a search request for labeled data with a similar distribution of values to the first feature in the training dataset. After receiving the results of the search request, the system may generate an updated training dataset by adding in values to the training dataset from the labeled data. Finally, the system may train a proximate machine learning model using the updated training dataset and insert the proximate machine learning model into a predictive cache of machine learning models.

The system may train a machine learning model using a training dataset. In particular, the system may train one or more machine learning models using a training dataset and insert the one or more machine learning models into a user library of machine learning models. For example, the system may receive a user request to train a machine learning model. The user request may include features selected by a user. For example, the system may train a machine learning model to generate product recommendations. Thus, the system is able to store a machine learning model into the user library of machine learning models.

The system may generate a search request. In particular, the system may without input from a user, based on a distribution of values for a first feature of a plurality of features from the training dataset, generate a search request to a database for labeled data having a distribution of values within a threshold of the distribution of values of the first feature. For example, the system may search for a new feature that is similar to the first feature in the training dataset. For example, a first feature may include a user's location in America. The system may determine there is a similar distribution within labeled data for a second feature of the user's location in Europe. Thus, the system may generate an updated training dataset.

The system may generate an updated training dataset. In particular, in response to the search request being successful, the system may generate an updated training dataset by adding in the training dataset values from the labeled data or replacing values for the first feature in the training dataset with the values from the labeled data. For example, the system may replace the first feature with the second feature. In another example, the system may find a third feature with a similar distribution. The third feature may include data on a user's age. The system may add the third feature to the training dataset to create the updated training dataset. Thus, the system has enough data to generate new machine learning models using previously labeled data.

The system may train a proximate machine learning model based on the updated training dataset. In particular, the system may train a proximate machine learning model based on the updated training dataset and insert the proximate machine learning model into a predictive cache of machine learning models. The proximate machine learning model is related to one or more machine learning models but was trained without input from the user. For example, the system may generate a new machine learning model using the updated training dataset. Thus, the system may generate a predictive cache of machine learning models without user input.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in generating a predictive cache of proximate machine learning models based on one or more trained machine learning models, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
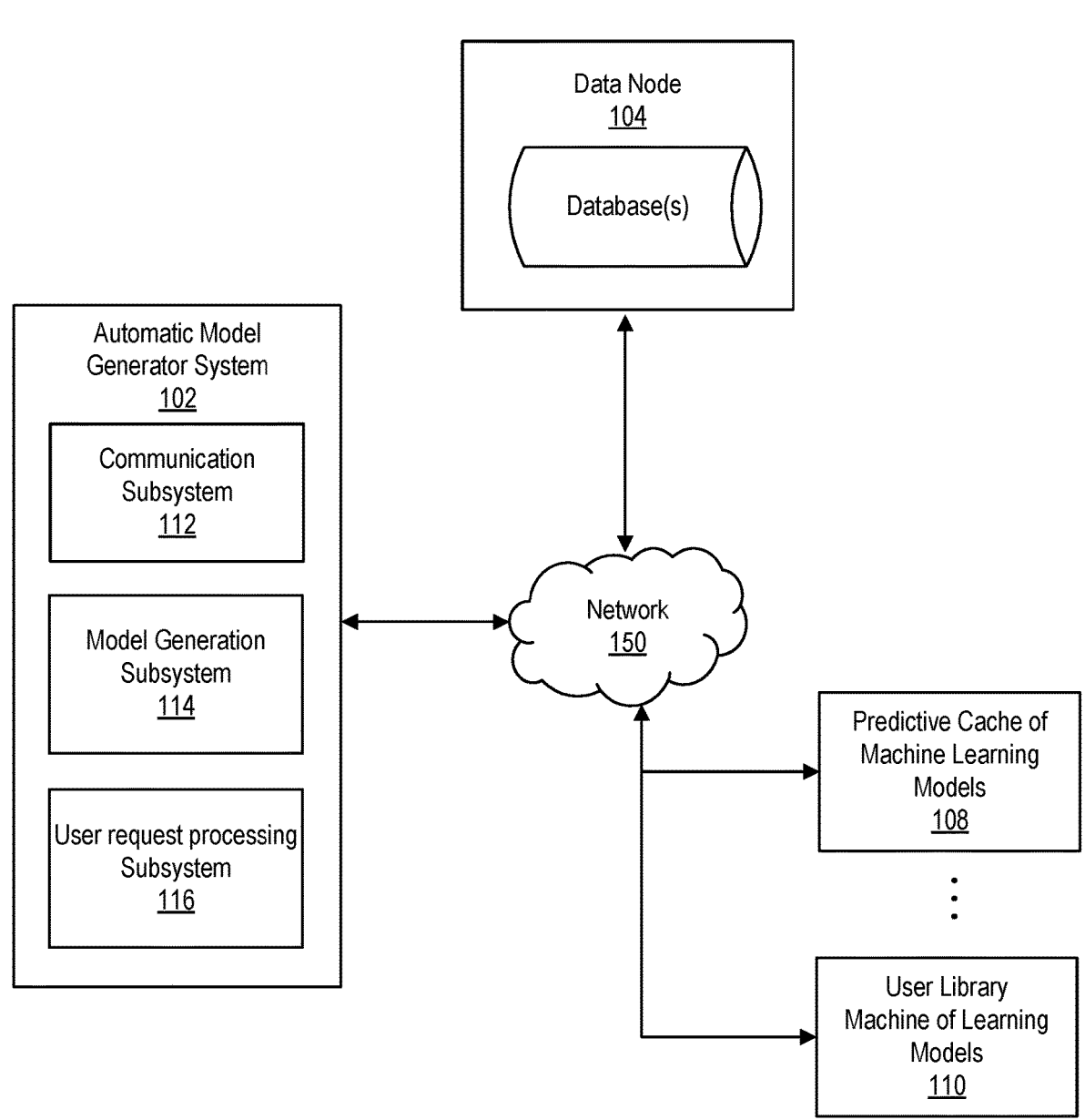
FIG. 1 shows an illustrative diagram for generating a predictive cache of proximate machine learning models based on one or more trained machine learning models, in accordance with one or more embodiments.

FIG. 1 shows an illustrative diagram for generating a predictive cache of proximate machine learning models based on one or more trained machine learning models, in accordance with one or more embodiments. Environment 100 includes automatic model generator system 102, data node 104, predictive cache of machine learning models 108, and user library of machine learning models 110. Automatic model generator system 102 may include software, hardware, or a combination of both and may reside on a physical server or a virtual server running on a physical computer system (e.g., server 202 described with respect to FIG. 2A). In some embodiments, automatic model generator system 102 may be configured on a user device (e.g., a laptop computer, a smartphone, a desktop computer, an electronic tablet, or another suitable user device). Furthermore, automatic model generator system 102 may reside on a cloud-based system and/or interface with computer models either directly or indirectly, for example, through network 150. Automatic model generator system 102 may include communication subsystem 112, model generation subsystem 114, and/or user request processing subsystem 116.

Data node 104 may store various data, including one or more machine learning models, training data, user data profiles, input data, output data, performance data, and/or other suitable data. Data node 104 may include software, hardware, or a combination of the two. In some embodiments, automatic model generator system 102 and data node 104 may reside on the same hardware and/or the same virtual server or computing device. Network 150 may be a local area network, a wide area network (e.g., the Internet), or a combination of the two.

Predictive cache of machine learning models 108 may include software, hardware, or a combination of the two. For example, predictive cache of machine learning models 108 may include software executed on the device or may include hardware, such as a physical device to store proximate machine learning models.

User library of machine learning models 110 may include software, hardware, or a combination of the two. For example, predictive cache of machine learning models 108 may include software executed on the device or may include hardware, such as a physical device to store user-requested machine learning models.

Automatic model generator system 102 may receive user requests. Automatic model generator system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as training datasets. Communication subsystem 112 may communicate with model generation subsystem 114 and user request processing subsystem 116.

Automatic model generator system 102 may train a machine learning model. Automatic model generator system 102 may train the machine learning model using model generation subsystem 114. Communication subsystem 112 may pass at least a portion of the data or a pointer to the data in memory to model generation subsystem 114. Model generation subsystem 114 may include software components, hardware components, or a combination of both. For example, model generation subsystem 114 may include software components or may include one or more hardware components (e.g., processors) that are able to execute operations for training machine learning models. Model generation subsystem 114 may access data, such as training datasets. Model generation subsystem 114 may directly access data or nodes associated with predictive cache of machine learning models 108 and user library of machine learning models 110. Model generation subsystem 114 may, additionally or alternatively, receive data from and/or send data to communication subsystem 112 and user request processing subsystem 116.

Automatic model generator system 102 may process user requests. Automatic model generator system 102 may process user requests using user request processing subsystem 116. User request processing subsystem 116 may include software components, hardware components, or a combination of both. For example, user request processing subsystem 116 may include software components or may include one or more hardware components (e.g., processors) that are able to execute operations for processing user requests. User request processing subsystem 116 may receive data from user requests. User request processing subsystem 116 may receive data from predictive cache of machine learning models 108 and user library of machine learning models 110. User request processing subsystem 116 may, additionally or alternatively, receive data from and/or send data to communication subsystem 112, and model generation subsystem 114.

Figure 2A:
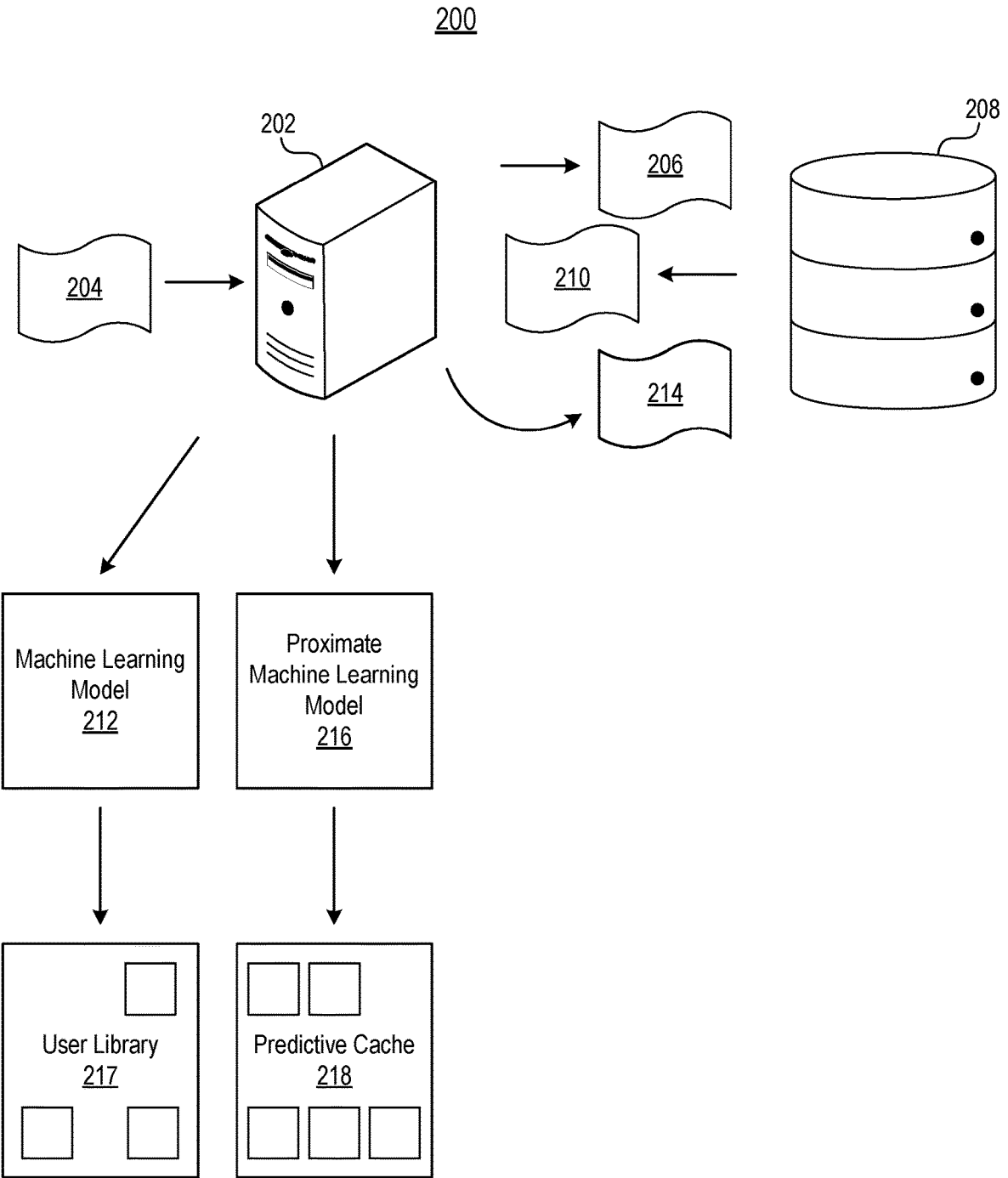
FIG. 2A and FIG. 2B show illustrative diagrams for training a proximate machine learning model and inserting the proximate machine learning model into a predictive cache of machine learning models, in accordance with one or more embodiments.
Figure 2B:
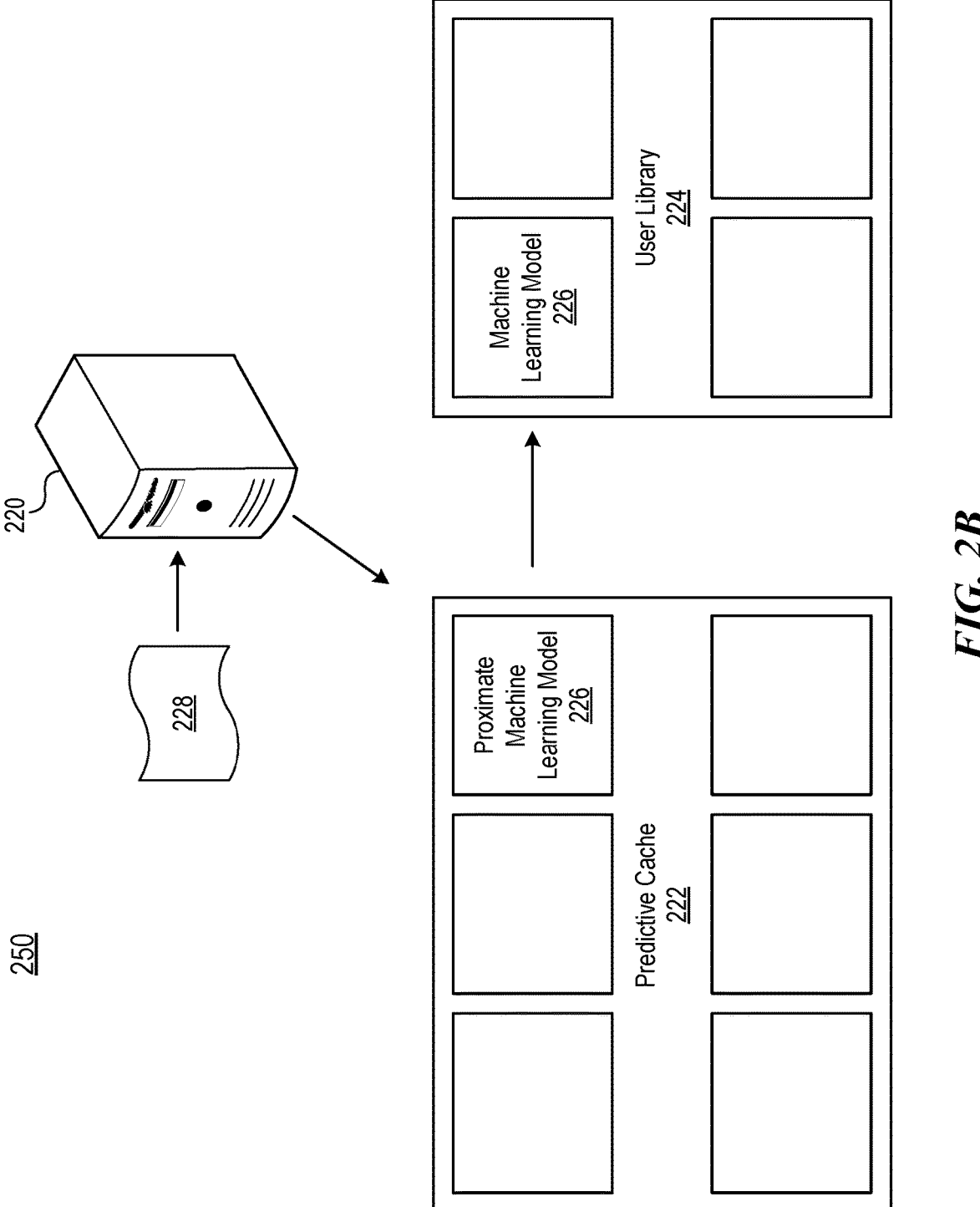

FIG. 2A-FIG. 2B show illustrative diagrams for training a proximate machine learning model and inserting the proximate machine learning model into a predictive cache of machine learning models, in accordance with one or more embodiments. FIG. 2A shows environment 200. Environment 200 includes server 202, user request 204, information request 206, database 208, training dataset 210, machine learning model 212, search request 214, proximate machine learning model 216, user library 217, and predictive cache 218.

In some embodiments, server 202 may generate an information request (e.g., information request 206) to a database (e.g., database 208). In particular, server 202 may generate an information request (e.g., information request 206) to a database (e.g., database 208). The information request may include a plurality of features selected by a user. For example, server 202 may generate information request 206 to database 208. For example, the system may generate information request 206 to database 208. Information request 206 may include features selected by the user to train a machine learning model on. For example, the user may train a machine learning model to detect fraudulent purchases on features such as location of user, price amount, and type of merchant. By doing so, the system is able to receive a training dataset for the machine learning model.

In some embodiments, prior to generating an information request (e.g., information request 206), server 202 may receive a first user request (e.g., user request 204). In particular, prior to generating an information request to a database (e.g., database 208), server 202 may receive a first user request (e.g., user request 204) for training a machine learning model. The first user request (e.g., user request 204) may include a plurality of features selected by the user. For example, server 202 may receive user request 204. User request 204 may include a plurality of features to train a machine learning model on. For example, the system may receive user request 204. User request 204 may include features selected by the user to train a machine learning model on. For example, the user may train a machine learning model to detect fraudulent purchases on features such as location of user, price amount, and type of merchant. By doing so, the system is able to generate the machine learning model.

In some embodiments, server 202 may receive a training dataset (e.g., training dataset 210). In particular, server 202 may receive, from the database (e.g., database 208), a training dataset (e.g., training dataset 210). The training dataset (e.g., training dataset 210) may include values for the plurality of features selected by the user. For example, the system may receive from database 208, training dataset 210 to train machine learning model 212.

Server 202 may train a machine learning model (e.g., machine learning model 212) using a training dataset (e.g., training dataset 210). In particular, server 202 may train one or more machine learning models (e.g., machine learning model 212) using a training dataset (e.g., training dataset 210) and insert the one or more machine learning models (e.g., machine learning model 212) into a user library of machine learning models (e.g., user library 217). For example, server 202 may train machine learning model 212 to generate product recommendations using training dataset 210. Thus, the system is able to store a machine learning model into the user library of machine learning models.

Server 202 may generate a search request. In particular, the system may without input from a user, based on a distribution of values for a first feature of a plurality of features from the training dataset, generate a search request to a database for labeled data having a distribution of values within a threshold of the distribution of values of the first feature. For example, the system may search for a new feature that is similar to the first feature in the training dataset. For example, a first feature may include a user's location in America. The system may determine there is a similar distribution within labeled data for a second feature of the user's location in Europe. Thus, the system may generate an updated training dataset.

Server 202 may generate an updated training dataset. In particular, in response to the search request (e.g., search request 214) being successful, server 202 may generate an updated training dataset by adding in the training dataset (e.g., training dataset 210) values from the labeled data or by replacing values for the first feature in the training dataset (e.g., training dataset 210) with the values from the labeled data. For example, the system may replace the first feature with the second feature. In another example, the system may find a third feature with a similar distribution. The third feature may include data on a user's age. The system may add the third feature to the training dataset to create the updated training dataset. Thus, the system has enough data to generate new machine learning models using previously labeled data.

In some embodiments, server 202 may generate a second search request. In particular, in response to the search request (e.g., search request 214) not being successful, based on a distribution of values for a second feature of the plurality of features, server 202 may generate a search request to the database for labeled data having a distribution of values within a threshold of the distribution of values of the second feature. For example, the system may generate another search request. Search request 214 for similar features to the first feature (e.g., user's location in America) may return nothing. Therefore, the system may generate a search request for the second feature in training dataset 210 (e.g., price range). By doing so, the system is able to generate a proximate machine learning model related to machine learning model 212.

In some embodiments, server 202 may insert a flag into the updated training dataset. In particular, when adding values for the first feature in the training dataset (e.g., training dataset 210) with values from the labeled data to generate an updated training dataset, server 202 may insert a flag into the updated training dataset to mark a portion of additional values. For example, the system may, before adding values from the labeled data (e.g., the user's location in Europe) to the first feature values (e.g., the user's location in America), insert a flag to mark the changes made in training dataset 210. By doing so, the system is easily able to revert changes made to the training dataset.

FIG. 2B shows environment 250. Environment 250 includes server 220, predictive cache 222, user library 224, proximate machine learning model 226, and user request 228.

Server 202 may train a proximate machine learning model based on the updated training dataset. In particular, server 202 may train a proximate machine learning model (e.g., proximate machine learning model 216 or proximate machine learning model 226) based on the updated training dataset and insert the proximate machine learning model (e.g., proximate machine learning model 216 or proximate machine learning model 226) into a predictive cache of machine learning models (e.g., predictive cache 218 or predictive cache 222). The proximate machine learning model (e.g., proximate machine learning model 216) is related to one or more machine learning models (e.g., machine learning model 212) but was trained without input from the user. For example, the system may generate a new machine learning model using the updated training dataset. Thus, the system may generate a predictive cache of machine learning models without user input.

In some embodiments, server 202 may generate an output. In particular, in response to a second user request (e.g., user request 228) including a plurality of features corresponding to the updated training dataset, server 202 may generate an output using the proximate machine learning model (e.g., proximate machine learning model 226) and transfer the proximate machine learning model (e.g., proximate machine learning model 226) from the predictive cache (e.g., predictive cache 222) to the user library of machine learning models (e.g., user library 224). For example, the system may receive user request 228. User request 228 may include features for a new machine learning model (e.g., location of user in Europe, price amount, and type of merchant). If the features match the features used to train proximate machine learning model 226, the system may store proximate machine learning model 226 as machine learning model 226 from predictive cache 222 to user library 224. By doing so, the system is able to determine which machine learning models are requested from the user the most.

In some embodiments, server 202 may receive a third user request. In particular, server 202 may receive a third user request for training a new machine learning model. The third user request may include a new plurality of features selected by the user. Server 202 may search the predictive cache of machine learning models (e.g., predictive cache 222) for a requested proximate machine learning model (e.g., proximate machine learning model 226). The requested proximate machine learning model (e.g., proximate machine learning model 226) may include the new plurality of features selected by the user. In response to the requested proximate machine learning model (e.g., proximate machine learning model 226) including a plurality of features corresponding to the third user request (e.g., user request 228), server 202 may generate an output using the requested proximate machine learning model (e.g., proximate machine learning model 226) and transfer the requested proximate machine learning model (e.g., proximate machine learning model 226) from the predictive cache (e.g., predictive cache 222) to the user library of machine learning models (e.g., user library 224) as the new machine learning model (e.g., machine learning model 226). Without input from the user, based on a distribution of values for a new first feature of the plurality of features, server 202 may generate a new search request to the database for labeled data having a distribution of values within a threshold of the distribution of values of the new first feature. In response to the search request being successful, server 202 may add values for the new first feature in a new training dataset with values from the labeled data to generate a new updated training dataset. The new training dataset may include the training dataset for the requested proximate machine learning model (e.g., proximate machine learning model 226). Server 202 may train a new proximate machine learning model based on the new updated training dataset and insert the new proximate machine learning model (e.g., proximate machine learning model 226) into a predictive cache of machine learning models (e.g., predictive cache 222). The new proximate machine learning model is related to the requested proximate machine learning model but was trained without input from the user. For example, another user may request to train a new machine learning model. In this instance, the system may start generating new proximate machine learning models based on the new machine learning model based on the new user input. By doing so, the system is able to consistently generate proximate machine learning models based on the newest user input.

In some embodiments, server 202 may receive a performance metric. In particular, server 202 may receive one or more performance metrics associated with the one or more machine learning models. Each performance metric indicates an accuracy level of a corresponding machine learning model. Server 202 may receive a performance metric associated with the proximate machine learning model (e.g., proximate machine learning model 226). For example, a performance metric may include metrics such as classification accuracy, confusion matrix accuracy, or F1 scores. Server 202 may compare the performance metric between the one or more machine learning models and the proximate machine learning model. Server 202 may in response to determining the performance metric associated with the proximate machine learning model is lower than a performance threshold, remove the proximate machine learning model from the user library of models. For example, the system may receive a performance metric for machine learning model 212 and another performance metric for proximate machine learning model 226. If the system determines, proximate machine learning model 226 performs at a lower standard than machine learning model 212, the system may remove proximate machine learning model 226 from the user library 224. By doing so, the system may assure only high-performing machine learning models are being stored in the user library.

In some embodiments, server 202 may update the predictive cache (e.g., predictive cache 218 or predictive cache 222) based on performance metrics. In particular, server 202 may in response to determining a performance metric associated with the requested proximate machine learning model (e.g., proximate machine learning model 226) is lower than a performance threshold, revert the requested proximate machine learning model (e.g., proximate machine learning model 226) back to the one or more machine learning models. Server 202 may search for a flag in the new training dataset. Server 202 may remove the values from the labeled data in the new training dataset. Server 202 may remove the new proximate machine learning model into a predictive cache of machine learning models. For example, the system may generate proximate machine learning model 226 with an accuracy metric of 72 percent. The system may remove proximate machine learning model 226 from predictive cache 218 or predictive cache 222 if the threshold is set to 75 percent. By doing so, the system is able to ensure only high-performing machine learning models are being generated and stored in the predictive cache.

In some embodiments, server 202 may receive a fourth user request. In particular, server 202 may receive a fourth user request. The fourth user request may include a plurality of features corresponding to the updated training dataset for the proximate machine learning model (e.g., proximate machine learning model 216). The proximate machine learning model (e.g., proximate machine learning model 216) is related to the one or more machine learning models but was trained without input from the user (e.g., machine learning model 212). The updated training dataset is related to the training dataset for the one or more machine learning models. Server 202 may determine the first feature of the training dataset is associated with a high priority score. The priority score indicates an importance of the first feature. For example, the system after receiving a user request for an existing proximate machine learning model in the predictive cache may determine the first feature associated with the training dataset and the updated training dataset is an important feature. Therefore, the system may associate the first feature with a high priority score. By doing so, the system may prioritize features with a high priority score when generating proximate machine learning models.

Figure 3:
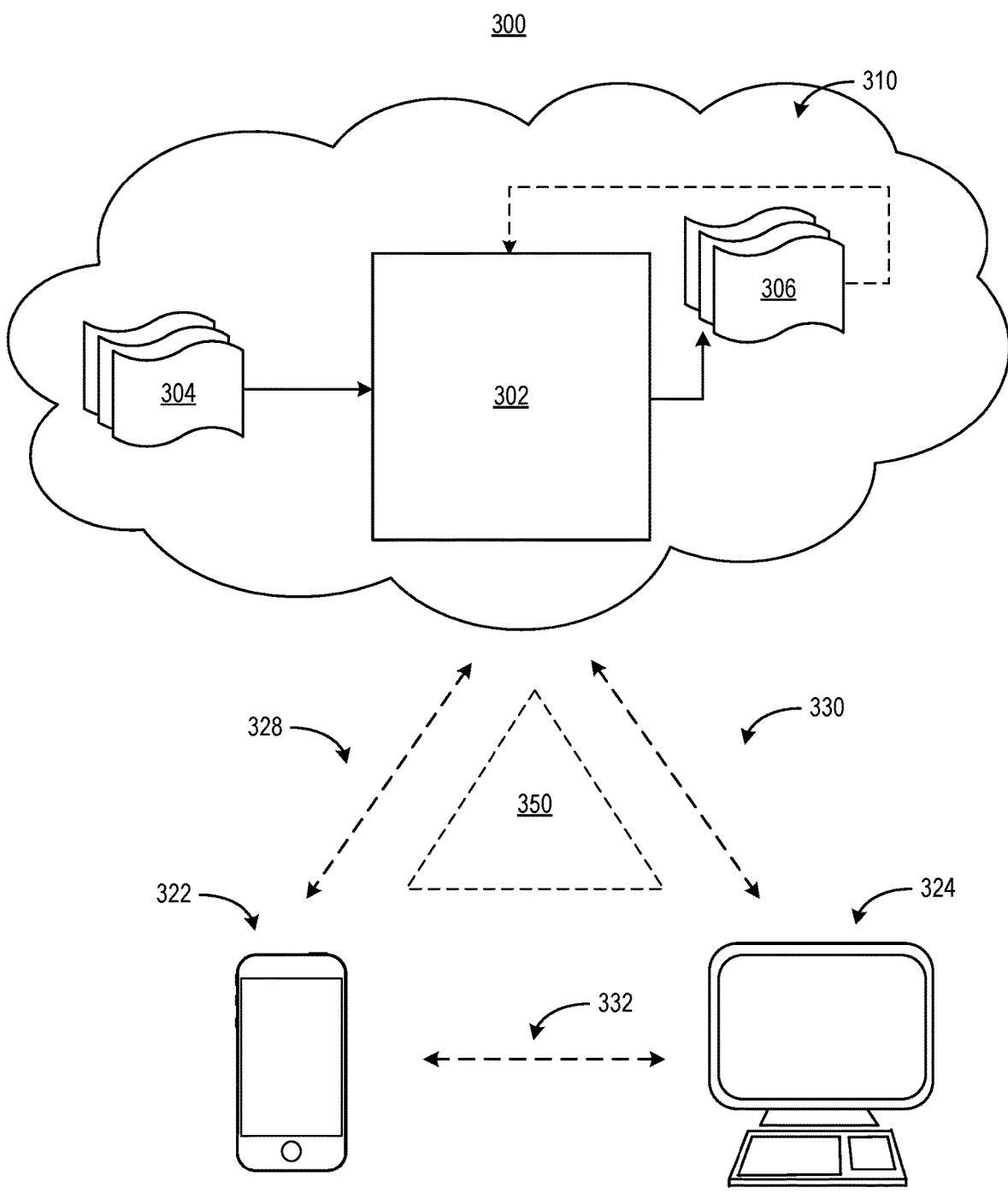
FIG. 3 shows illustrative components for a system used alongside machine learning models, in accordance with one or more embodiments.

FIG. 3 shows illustrative components for a system used to generate a predictive cache of proximate machine learning models based on one or more trained machine learning models, in accordance with one or more embodiments. For example, FIG. 3 may show illustrative components for leveraging already existing models and labeled data points to generate new machine learning concepts. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other devices. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include automatic model generator system 102, communication subsystem 112, model generation subsystem 114, user request processing subsystem 116, data node 104, predictive cache of machine learning models 108, user library of machine learning models 110, or network 150. Cloud components 310 may access machine learning models stored in predictive cache of machine learning models 108 or user library of machine learning models 110.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., detecting fraudulent purchases).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., classifying a user's credit score).

In some embodiments, the model (e.g., model 302) may automatically perform actions based on outputs 306. In some embodiments, the model (e.g., model 302) may not perform any actions. The output of the model (e.g., model 302) may be used to predict outcomes, perform classification, or for any other function for which a machine learning model may be used.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints by applying web application firewall (WAF) and denial-of-service (DDoS) protection, and API layer 350 may use RESTful APIs as standard for external integration.

FIG. 4 shows a flowchart of the steps involved in generating a predictive cache of proximate machine learning models based on one or more trained machine learning models, in accordance with one or more embodiments. For example, the system may use process 400 (e.g., as implemented on one or more system components described above) in order to leverage already existing models and labeled data points to generate new machine learning concepts.

At operation 402, process 400 (e.g., using one or more components described above) may train one or more machine learning models using a training dataset and insert the one or more machine learning models into a user library of machine learning models. For example, the system may train one or more machine learning models using a training dataset and insert the one or more machine learning models into a user library of machine learning models. For example, model generation subsystem 114 may train one or more machine learning models (e.g., machine learning model 212 or model 302) using a training dataset (e.g., training dataset 210 or input 304) and insert the one or more machine learning models (e.g., machine learning model 212) into a user library of machine learning models (e.g., user library 217). By doing so, the system may store a machine learning model into the user library of machine learning models.

In some embodiments, the system may generate an information request to a database. For example, the system may generate an information request. The information request may include a plurality of features selected by a user. For example, user request processing subsystem 116 may generate an information request (e.g., information request 206) to a database (e.g., database 208). The information request may include a plurality of features selected by a user. By doing so, the system is able to receive a training dataset for the machine learning model.

In some embodiments, prior to generating an information request, the system may receive a first user request. For example, prior to generating an information request to a database, the system may receive a first user request for training a machine learning model. The first user request may include a plurality of features selected by the user. For example, communication subsystem 112 may receive a first user request (e.g., user request 204) for training a machine learning model (e.g., machine learning model 212 or model 302) using communication paths 328, 330, and 332. The first user request (e.g., user request 204) may include a plurality of features selected by the user. By doing so, the system is able to generate the machine learning model.

In some embodiments, the system may receive a training dataset. For example, the system may receive, from the database, a training dataset. The training dataset may include values for the plurality of features selected by the user. For example, communication subsystem 112 may receive, from the database (e.g., database 208), a training dataset (e.g., training dataset 210) using communication paths 328, 330, and 332. The training dataset (e.g., training dataset 210) may include values for the plurality of features selected by the user. By doing so, the system may ensure the machine learning model is being trained with accurate data.

At operation 404, process 400 based on a distribution of values for a first feature, may generate a search request to a database for labeled data having a distribution of values within a threshold of the distribution of values of the first feature. For example, the system may without input from a user, based on a distribution of values for a first feature of a plurality of features from the training dataset, generate a search request to a database for labeled data having a distribution of values within a threshold of the distribution of values of the first feature. For example, model generation subsystem 114 may without input from a user, based on a distribution of values for a first feature of a plurality of features from the training dataset (e.g., training dataset 210), generate a search request (e.g., search request 214) to a database (e.g., database 208) for labeled data having a distribution of values within a threshold of the distribution of values of the first feature. By doing so, the system may generate an updated training dataset.

At operation 406, process 400 may generate an updated training dataset by adding in the training dataset values from the labeled data. For example, in response to the search request being successful, the system may generate an updated training dataset by adding in the training dataset values from the labeled data or by replacing values for the first feature in the training dataset with the values from labeled data. For example, in response to the search request (e.g., search request 214) being successful, model generation subsystem 114 may generate an updated training dataset by adding in the training dataset (e.g., training dataset 210) values from the labeled data or by replacing values for the first feature in the training dataset (e.g., training dataset 210) with the values from the labeled data. By doing so, the system has additional data to generate new machine learning models using previously labeled data.

In some embodiments, the system may generate a second search request. For example, in response to the search request not being successful, based on a distribution of values for a second feature of the plurality of features, the system may generate a search request to the database for labeled data having a distribution of values within a threshold of the distribution of values of the second feature. For example, in response to the search request (e.g., search request 214) not being successful, based on a distribution of values for a second feature of the plurality of features, model generation subsystem 114 may generate a search request to the database (e.g., database 208) for labeled data having a distribution of values within a threshold of the distribution of values of the second feature. By doing so, the system is able to generate a proximate machine learning model related to a machine learning model.

In some embodiments, the system may insert a flag into the updated training dataset. For example, when adding values for the first feature in the training dataset with values from the labeled data to generate an updated training dataset, the system may insert a flag into the updated training dataset to mark a portion of additional values. For example, when adding values for the first feature in the training dataset (e.g., training dataset 210) with values from the labeled data to generate an updated training dataset, model generation subsystem 114 may insert a flag into the updated training dataset to mark a portion of additional values. By doing so, the system is easily able to revert changes made to the training dataset.

At operation 408, process 400 may train a proximate machine learning model based on the updated training dataset and insert the proximate machine learning model into a predictive cache of machine learning models. For example, the system may train a proximate machine learning model based on the updated training dataset and insert the proximate machine learning model into a predictive cache of machine learning models. The proximate machine learning model is related to one or more machine learning models but was trained without input from the user. For example, model generation subsystem 114 may train a proximate machine learning model (e.g., proximate machine learning model 216 or proximate machine learning model 226) based on the updated training dataset (e.g., input 304) and insert the proximate machine learning model (e.g., proximate machine learning model 216 or proximate machine learning model 226) into a predictive cache of machine learning models (e.g., predictive cache 218 or predictive cache 222). The proximate machine learning model (e.g., proximate machine learning model 216) is related to one or more machine learning models (e.g., machine learning model 212) but was trained without input from the user. By doing so, the system may generate a predictive cache of machine learning models without user input.

In some embodiments, the system may generate an output. For example, in response to a second user request including a plurality of features corresponding to the updated training dataset, the system may generate an output using the proximate machine learning model and transfer the proximate machine learning model from the predictive cache to the user library of machine learning models. For example, in response to a second user request (e.g., user request 228) including a plurality of features corresponding to the updated training dataset, user request processing subsystem 116 may generate an output (e.g., output 306) using the proximate machine learning model (e.g., proximate machine learning model 226) and transferring the proximate machine learning model (e.g., proximate machine learning model 226) from the predictive cache (e.g., predictive cache 222) to the user library of machine learning models (e.g., user library 224). By doing so, the system is able to determine which machine learning models are requested from the user the most.

In some embodiments, the system may receive a third user request. For example, communication subsystem 112 may receive a third user request for training a new machine learning model. The third user request may include a new plurality of features selected by the user. Communication subsystem 112 may search the predictive cache of machine learning models (e.g., predictive cache 222) for a requested proximate machine learning model (e.g., proximate machine learning model 226). The requested proximate machine learning model (e.g., proximate machine learning model 226) may include the new plurality of features selected by the user. In response to the requested proximate machine learning model (e.g., proximate machine learning model 226) including a plurality of features corresponding to the third user request (e.g., user request 228), communication subsystem 112 may generate an output (e.g., output 306) using the requested proximate machine learning model (e.g., proximate machine learning model 226) and transferring the requested proximate machine learning model (e.g., proximate machine learning model 226) from the predictive cache (e.g., predictive cache 222) to the user library of machine learning models (e.g., user library 224) as the new machine learning model (e.g., machine learning model 226). Without input from the user, based on a distribution of values for a new first feature of the plurality of features, model generation subsystem 114 may generate a new search request to the database for labeled data having a distribution of values within a threshold of the distribution of values of the new first feature. In response to the search request being successful, model generation subsystem 114 may add values for the new first feature in a new training dataset with values from the labeled data to generate a new updated training dataset. The new training dataset may include the training dataset for the requested proximate machine learning model (e.g., proximate machine learning model 226). Server 202 may train a new proximate machine learning model based on the new updated training dataset and insert the new proximate machine learning model (e.g., proximate machine learning model 226) into a predictive cache of machine learning models (e.g., predictive cache 222). The new proximate machine learning model is related to the requested proximate machine learning model but was trained without input from the user. By doing so, the system is able to consistently generate proximate machine learning models based on the newest user input.

In some embodiments, the system may receive a performance metric. For example, the system may receive one or more performance metrics associated with the one or more machine learning models. Each performance metric indicates an accuracy level of a corresponding machine learning model. The system may receive a performance metric associated with the proximate machine learning model. The system may compare the performance metric between the one or more machine learning models and the proximate machine learning model. The system may in response to determining the performance metric associated with the proximate machine learning model is lower than a performance threshold, remove the proximate machine learning model from the user library of models. For example, communication subsystem 112 may receive one or more performance metrics associated with the one or more machine learning models. Each performance metric indicates an accuracy level of a corresponding machine learning model. Communication subsystem 112 may receive a performance metric associated with the proximate machine learning model (e.g., proximate machine learning model 226). Model generation subsystem 114 may compare the performance metric between the one or more machine learning models and the proximate machine learning model. Model generation subsystem 114 may in response to determining the performance metric associated with the proximate machine learning model is lower than a performance threshold, remove the proximate machine learning model (e.g., proximate machine learning model 216 or model 302) from the user library of models (e.g., user library 217). By doing so, the system may assure only high-performing machine learning models are being stored in the user library.

In some embodiments, the system may update the predictive cache based on performance metrics. For example, the system may in response to determining a performance metric associated with the requested proximate machine learning model is lower than a performance threshold, revert the requested proximate machine learning model back to one or more machine learning models. The system may search for a flag in the new training dataset. The system may remove the values from the labeled data in the new training dataset. The system may remove the new proximate machine learning model into a predictive cache of machine learning models. For example, model generation subsystem 114 may in response to determining a performance metric associated with the requested proximate machine learning model (e.g., proximate machine learning model 226) is lower than a performance threshold, revert the requested proximate machine learning model (e.g., proximate machine learning model 226) back to the one or more machine learning models. Model generation subsystem 114 may search for a flag in the new training dataset. Model generation subsystem 114 may remove the values from the labeled data in the new training dataset. Model generation subsystem 114 may remove the new proximate machine learning model (e.g., model 302) into a predictive cache of machine learning models (e.g., predictive cache 218 or predictive cache 222). By doing so, the system is able to ensure only high-performing machine learning models are being generated and stored into the predictive cache.

In some embodiments, the system may receive a fourth user request. For example, the system may receive a fourth user request. The fourth user request may include a plurality of features corresponding to the updated training dataset for the proximate machine learning model. The proximate machine learning model is related to the one or more machine learning models but was trained without input from the user. The updated training dataset is related to the training dataset for the one or more machine learning models. The system may determine the first feature of the training dataset is associated with a high priority score. The priority score indicates an importance of the first feature. For example, communication subsystem 112 may receive a fourth user request using communication paths 328, 330, and 332. The fourth user request may include a plurality of features corresponding to the updated training dataset for the proximate machine learning model (e.g., proximate machine learning model 216). The proximate machine learning model (e.g., proximate machine learning model 216) is related to the one or more machine learning models but was trained without input from the user (e.g., machine learning model 212). The updated training dataset is related to the training dataset for the one or more machine learning models. User request processing subsystem 116 may determine the first feature of the training dataset is associated with a high priority score. The priority score indicates an importance of the first feature. By doing so, the system may prioritize features with a high priority score when generating proximate machine learning models.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating a predictive cache of proximate machine learning models based on one or more trained machine learning models, the method comprising: receiving a first user request for training a machine learning model, wherein the first user request comprises a plurality of features selected by a user; generating an information request to a database, wherein the information request comprises the plurality of features selected by the user; receiving, from the database, a training dataset, wherein the training dataset comprises values for the plurality of features selected by the user; training one or more machine learning models using the training dataset and inserting the one or more machine learning models into a user library of machine learning models; without input from the user, based on a distribution of values for a first feature of the plurality of features, generating a search request to the database for labeled data having a distribution of values within a threshold of the distribution of values of the first feature; in response to the search request being successful, replacing values for the first feature in the training dataset with values from the labeled data to generate an updated training dataset; training a proximate machine learning model based on the updated training dataset and inserting the proximate machine learning model into a predictive cache of machine learning models, wherein the proximate machine learning model is related to the one or more machine learning models but was trained without input from the user; and in response to a second user request comprising a plurality of features corresponding to the updated training dataset, generating an output using the proximate machine learning model and transferring the proximate machine learning model from the predictive cache to the user library of machine learning models.

2. A method for generating a predictive cache of proximate machine learning models based on one or more trained machine learning models, comprising: generating an information request to a database, wherein the information request comprises a plurality of features selected by a user; receiving, from the database, a training dataset, wherein the training dataset comprises values for the plurality of features selected by the user; training one or more machine learning models using the training dataset and inserting the one or more machine learning models into a user library of machine learning models; without input from the user, based on a distribution of values for a first feature of the plurality of features, generating a search request to the database for labeled data having a distribution of values within a threshold of the distribution of values of the first feature; in response to the search request being successful, adding to the training dataset values from the labeled data to generate an updated training dataset; and training a proximate machine learning model based on the updated training dataset and inserting the proximate machine learning model into a predictive cache of machine learning models, wherein the proximate machine learning model is related to the one or more machine learning models but was trained without input from the user.

3. A method, comprising: training one or more machine learning models using a training dataset and inserting the one or more machine learning models into a user library of machine learning models; without input from a user, based on a distribution of values for a first feature of a plurality of features from the training dataset, generating a search request to a database for labeled data having a distribution of values within a threshold of the distribution of values of the first feature; in response to the search request being successful, generating an updated training dataset by adding in the training dataset values from the labeled data or replacing values for the first feature in the training dataset with the values from the labeled data; and training a proximate machine learning model based on the updated training dataset and inserting the proximate machine learning model into a predictive cache of machine learning models, wherein the proximate machine learning model is related to the one or more machine learning models but was trained without input from the user.

4. The method of any one of the preceding embodiments, wherein prior to generating an information request to a database, wherein the information request comprises the plurality of features selected by a user, receiving a first user request for training a machine learning model, wherein the first user request comprises a plurality of features selected by the user.

5. The method of any one of the preceding embodiments, further comprising: in response to a second user request comprising a plurality of features corresponding to the updated training dataset, generating an output using the proximate machine learning model and transferring the proximate machine learning model from the predictive cache to the user library of machine learning models.

6. The method of any one of the preceding embodiments, wherein adding values for the first feature in the training dataset with values from the labeled data to generate an updated training dataset further comprises inserting a flag into the updated training dataset to mark a portion of additional values.

7. The method of any one of the preceding embodiments, further comprising: receiving a third user request for training a new machine learning model, wherein the third user request comprises a new plurality of features selected by the user; searching the predictive cache of machine learning models for a requested proximate machine learning model, wherein the requested proximate machine learning model comprises the new plurality of features selected by the user; in response to the requested proximate machine learning model comprising a plurality of features corresponding to the third user request, generating an output using the requested proximate machine learning model and transferring the requested proximate machine learning model from the predictive cache to the user library of machine learning models as the new machine learning model; without input from the user, based on a distribution of values for a new first feature of the plurality of features, generating a new search request to the database for labeled data having a distribution of values within a threshold of the distribution of values of the new first feature; in response to the search request being successful, adding values for the new first feature in a new training dataset with values from the labeled data to generate a new updated training dataset, wherein the new training dataset comprises the training dataset for the requested proximate machine learning model; and training a new proximate machine learning model based on the new updated training dataset and inserting the new proximate machine learning model into a predictive cache of machine learning models, wherein the new proximate machine learning model are related to the requested proximate machine learning model but were trained without input from the user.

8. The method of any one of the preceding embodiments, wherein in response to the search request not being successful, based on a distribution of values for a second feature of the plurality of features, generating a search request to the database for labeled data having a distribution of values within a threshold of the distribution of values of the second feature.

9. The method of any one of the preceding embodiments, further comprising:
receiving one or more performance metrics associated with the one or more machine learning models, wherein each performance metric indicates an accuracy level of a corresponding machine learning model; receiving a performance metric associated with the proximate machine learning model; comparing the performance metric between the one or more machine learning models and the proximate machine learning model; and in response to determining the performance metric associated with the proximate machine learning model is lower than a performance threshold, removing the proximate machine learning model from the user library of models.

10. The method of any one of the preceding embodiments, further comprising: receiving a fourth user request, wherein the fourth user request comprises a plurality of features corresponding to the updated training dataset for the proximate machine learning model, wherein the proximate machine learning model is related to the one or more machine learning models but was trained without input from the user, and wherein the updated training dataset is related to the training dataset for the one or more machine learning models; and determining the first feature of the training dataset is associated with a high priority score, wherein a priority score indicates an importance of the first feature.

11. The method of any one of the preceding embodiments, further comprising: in response to determining a performance metric associated with the requested proximate machine learning model is lower than a performance threshold, reverting the requested proximate machine learning model back to the one or more machine learning models by: searching for a flag in the new training dataset; and removing the values from the labeled data in the new training dataset; and removing the new proximate machine learning model into a predictive cache of machine learning models.

12. A non-transitory, computer-readable storage medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for generating a predictive cache of proximate machine learning models based on one or more trained machine learning models, comprising:
   one or more processors; and
   a non-transitory, computer-readable medium storing instructions that when executed by the one or more processors cause operations comprising:
      receiving a first user request for training a machine learning model, wherein the first user request comprises a plurality of features selected by a user;
      generating an information request to a database, wherein the information request comprises the plurality of features selected by the user;
      receiving, from the database, a training dataset, wherein the training dataset comprises values for the plurality of features selected by the user;
      training one or more machine learning models using the training dataset and inserting the one or more machine learning models into a user library of machine learning models;
      without input from the user, based on a distribution of values for a first feature of the plurality of features, generating a search request to the database for labeled data having a distribution of values within a threshold of the distribution of values of the first feature;
      in response to the search request being successful, replacing values for the first feature in the training dataset with values from the labeled data to generate an updated training dataset;

21 training a proximate machine learning model based on the updated training dataset and inserting the proximate machine learning model into a predictive cache of machine learning models, wherein the proximate machine learning model is related to the one or more machine learning models but was trained without input from the user; and in response to a second user request comprising a plurality of features corresponding to the updated training dataset, generating an output using the proximate machine learning model and transferring the proximate machine learning model from the predictive cache to the user library of machine learning models.

2. The system of claim 1, further comprising:

receiving a third user request for training a new machine learning model, wherein the third user request comprises a new plurality of features selected by the user;

searching the predictive cache of machine learning models for a requested proximate machine learning model, wherein the requested proximate machine learning model comprises the new plurality of features selected by the user;

in response to the requested proximate machine learning model comprising a plurality of features corresponding to the third user request, generating an output using the requested proximate machine learning model and transferring the requested proximate machine learning model from the predictive cache to the user library of machine learning models as the new machine learning model;

without input from the user, based on a distribution of values for a new first feature of the plurality of features, generating a new search request to the database for labeled data having a distribution of values within a threshold of the distribution of values of the new first feature;

in response to the search request being successful, replacing values for the new first feature in a new training dataset with values from the labeled data to generate a new updated training dataset, wherein the new training dataset comprises the training dataset for the requested proximate machine learning model; and training one or more proximate machine learning models based on the updated training dataset and inserting the one or more proximate machine learning models into the predictive cache of machine learning models, wherein the proximate machine learning model is related to the new machine learning model but was trained without input from the user.

3. The system of claim 1, wherein in response to the search request not being successful, based on a distribution of values for a second feature of the plurality of features, generating a search request to the database for labeled data having a distribution of values within a threshold of the distribution of values of the second feature.

4. A method for generating a predictive cache of proximate machine learning models based on one or more trained machine learning models, comprising:

generating an information request to a database, wherein the information request comprises a plurality of features selected by a user;

receiving, from the database, a training dataset, wherein the training dataset comprises values for the plurality of features selected by the user;

22 training one or more machine learning models using the training dataset and inserting the one or more machine learning models into a user library of machine learning models;

without input from the user, based on a distribution of values for a first feature of the plurality of features, generating a search request to the database for labeled data having a distribution of values within a threshold of the distribution of values of the first feature;

in response to the search request being successful, adding to the training dataset values from the labeled data to generate an updated training dataset; and training a proximate machine learning model based on the updated training dataset and inserting the proximate machine learning model into a predictive cache of machine learning models, wherein the proximate machine learning model is related to the one or more machine learning models but was trained without input from the user.

5. The method of claim 4, wherein prior to generating an information request to a database, wherein the information request comprises the plurality of features selected by a user, receiving a first user request for training a machine learning model, wherein the first user request comprises a plurality of features selected by the user.

6. The method of claim 4, further comprising:

in response to a second user request comprising a plurality of features corresponding to the updated training dataset, generating an output using the proximate machine learning model and transferring the proximate machine learning model from the predictive cache to the user library of machine learning models.

7. The method of claim 4, wherein adding values for the first feature in the training dataset with values from the labeled data to generate an updated training dataset further comprises inserting a flag into the updated training dataset to mark a portion of additional values.

8. The method of claim 4, further comprising:

receiving a third user request for training a new machine learning model, wherein the third user request comprises a new plurality of features selected by the user;

searching the predictive cache of machine learning models for a requested proximate machine learning model, wherein the requested proximate machine learning model comprises the new plurality of features selected by the user;

in response to the requested proximate machine learning model comprising a plurality of features corresponding to the third user request, generating an output using the requested proximate machine learning model and transferring the requested proximate machine learning model from the predictive cache to the user library of machine learning models as the new machine learning model;

without input from the user, based on a distribution of values for a new first feature of the plurality of features, generating a new search request to the database for labeled data having a distribution of values within a threshold of the distribution of values of the new first feature;

in response to the search request being successful, adding values for the new first feature in a new training dataset with values from the labeled data to generate a new updated training dataset, wherein the new training dataset comprises the training dataset for the requested proximate machine learning model; and training a new proximate machine learning model based on the new updated training dataset and inserting the new proximate machine learning model into a predictive cache of machine learning models, wherein the new proximate machine learning model is related to the requested proximate machine learning model but was trained without input from the user.

9. The method of claim 8, further comprising:

in response to determining a performance metric associated with the requested proximate machine learning model is lower than a performance threshold, reverting the requested proximate machine learning model back to the one or more machine learning models by:

searching for a flag in the new training dataset; and removing the values from the labeled data in the new training dataset; and removing the new proximate machine learning model into a predictive cache of machine learning models.

10. The method of claim 4, wherein in response to the search request not being successful, based on a distribution of values for a second feature of the plurality of features, generating a search request to the database for labeled data having a distribution of values within a threshold of the distribution of values of the second feature.

11. The method of claim 4, further comprising:

receiving one or more performance metrics associated with the one or more machine learning models, wherein each performance metric indicates an accuracy level of a corresponding machine learning model;

receiving a performance metric associated with the proximate machine learning model;

comparing the performance metric between the one or more machine learning models and the proximate machine learning model; and in response to determining the performance metric associated with the proximate machine learning model is lower than a performance threshold, removing the proximate machine learning model from the user library of models.

12. The method of claim 4, further comprising:

receiving a fourth user request, wherein the fourth user request comprises a plurality of features corresponding to the updated training dataset for the proximate machine learning model, wherein the proximate machine learning model is related to the one or more machine learning models but was trained without input from the user, and wherein the updated training dataset is related to the training dataset for the one or more machine learning models; and determining the first feature of the training dataset is associated with a high priority score, wherein a priority score indicates an importance of the first feature.

13. A non-transitory, computer-readable storage medium storing instructions that when executed by one or more processors cause the one or more processors to perform operations comprising:

training one or more machine learning models using a training dataset and inserting the one or more machine learning models into a user library of machine learning models;

without input from a user, based on a distribution of values for a first feature of a plurality of features from the training dataset, generating a search request to a database for labeled data having a distribution of values within a threshold of the distribution of values of the first feature;

in response to the search request being successful, generating an updated training dataset by adding in the training dataset values from the labeled data or replacing values for the first feature in the training dataset with the values from the labeled data; and training a proximate machine learning model based on the updated training dataset and inserting the proximate machine learning model into a predictive cache of machine learning models, wherein the proximate machine learning model is related to the one or more machine learning models but was trained without input from the user.

14. The non-transitory, computer-readable storage medium of claim 13, wherein the instructions further cause the one or more processors to perform operations comprising:

receiving a third user request for training a new machine learning model, wherein the third user request comprises a new plurality of features selected by the user;

searching the predictive cache of machine learning models for a requested proximate machine learning model, wherein the requested proximate machine learning model comprises the new plurality of features selected by the user;

in response to the requested proximate machine learning model comprising a plurality of features corresponding to the third user request, generating an output using the requested proximate machine learning model and transferring the requested proximate machine learning model from the predictive cache to the user library of machine learning models as the new machine learning model;

without input from the user, based on a distribution of values for a new first feature of the plurality of features, generating a new search request to the database for labeled data having a distribution of values within a threshold of the distribution of values of the new first feature;

in response to the search request being successful, adding values for the new first feature in a new training dataset with values from the labeled data to generate a new updated training dataset, wherein the new training dataset comprises the training dataset for the requested proximate machine learning model; and training a new proximate machine learning model based on the new updated training dataset and inserting the new proximate machine learning model into a predictive cache of machine learning models, wherein the new proximate machine learning model is related to the requested proximate machine learning model but was trained without input from the user.

15. The non-transitory, computer-readable storage medium of claim 14, wherein the instructions further cause the one or more processors to perform operations comprising:

in response to determining a performance metric associated with the requested proximate machine learning model is lower than a performance threshold, reverting the requested proximate machine learning model back to the one or more machine learning models by:

searching for a flag in the new training dataset; and removing the values from the labeled data in the new training dataset; and removing the new proximate machine learning model into a predictive cache of machine learning models.

16. The non-transitory, computer-readable storage medium of claim 13, wherein the instructions further cause the one or more processors to perform operations comprising:

in response to a user request comprising a plurality of features corresponding to the updated training dataset, generating an output using the proximate machine learning model and transferring the proximate machine learning model from the predictive cache to the user library of machine learning models.

17. The non-transitory, computer-readable storage medium of claim 13, wherein the instructions further cause the one or more processors to perform operations comprising:

receiving one or more performance metrics associated with the one or more machine learning models, wherein each performance metric indicates an accuracy level of a corresponding machine learning model;

receiving a performance metric associated with the proximate machine learning model;

comparing the performance metric between the one or more machine learning models and the proximate machine learning model; and in response to determining the performance metric associated with the proximate machine learning model is lower than a performance threshold, removing the proximate machine learning model from the user library of models.

18. The non-transitory, computer-readable storage medium of claim 13, wherein the instructions further cause the one or more processors to perform operations comprising:

in response to the search request not being successful, based on a distribution of values for a second feature of the plurality of features, generating a search request to the database for labeled data having a distribution of values within a threshold of the distribution of values of the second feature.

19. The non-transitory, computer-readable storage medium of claim 13, wherein the instructions to add values for the first feature in the training dataset with values from the labeled data to generate an updated training dataset further cause the one or more processors to insert a flag into the updated training dataset to mark a portion of additional values.

20. The non-transitory, computer-readable storage medium of claim 13, wherein the instructions further cause the one or more processors to perform operations comprising:

receiving a fourth user request, wherein the fourth user request comprises a plurality of features corresponding to the updated training dataset for the proximate machine learning model, wherein the proximate machine learning model is related to the one or more machine learning models but was trained without input from the user, and wherein the updated training dataset is related to the training dataset for the one or more machine learning models; and determining the first feature of the training dataset is associated with a high priority score, wherein a priority score indicates an importance of the first feature.

* * * * *